United States Patent [19]

Kawamura et al.

[11] Patent Number: 4,658,284

[45] Date of Patent: Apr. 14, 1987

[54] IMAGE FORMING APPARATUS

[75] Inventors: Hideaki Kawamura, Tokyo; Nobuaki Sakurada, Yokohama; Takashi Sasaki, Tokyo, all of Japan

[73] Assignee: Canon Kabushiki Kaisha, Tokyo, Japan

[21] Appl. No.: 688,429

[22] Filed: Jan. 2, 1985

[30] Foreign Application Priority Data

Jan. 11, 1984 [JP] Japan .................................. 59-3291

[51] Int. Cl.⁴ ........................ H04N 9/79; H04N 11/20
[52] U.S. Cl. ........................................ 358/11; 358/140; 358/280; 358/310
[58] Field of Search ............... 358/280, 78, 28, 23, 358/24, 140, 77, 287, 11, 310

[56] References Cited

U.S. PATENT DOCUMENTS

| 4,463,374 | 7/1984 | Thompson | 358/78 |
| 4,485,413 | 11/1984 | Furuta | 358/78 |
| 4,504,852 | 3/1985 | Ducret | 358/140 |
| 4,550,335 | 10/1985 | Powers | 358/140 |
| 4,563,700 | 1/1986 | Sato | 358/140 |

FOREIGN PATENT DOCUMENTS

| 2943271 | 5/1981 | Fed. Rep. of Germany | 358/24 |
| 2433876 | 4/1980 | France | 358/24 |
| 0143991 | 9/1982 | Japan | 358/24 |
| 0197986 | 12/1982 | Japan | 358/24 |
| 0020090 | 2/1983 | Japan | 358/24 |
| 0141093 | 8/1983 | Japan | 358/24 |

*Primary Examiner*—Howard W. Britton
*Attorney, Agent, or Firm*—Fitzpatrick, Cella, Harper & Scinto

[57] ABSTRACT

There is disclosed an image forming apparatus for obtaining an image from a television image with 625 horizontal scanning lines with a circuitry substantially same as that for obtaining an image from a television image with 525 horizontal scanning lines. In this apparatus the samples from six scanning lines are converted to form five scanning lines by means of sampling circuit and converting circuit.

10 Claims, 3 Drawing Figures

IMAGE FORMING APPARATUS

BACKGROUND OF THE INVENTION

1. Field of the Invention

The present invention relates to an image forming apparatus for forming an image from an input video signal, and more particularly to such apparatus particularly adapted for use in a television system utilizing 625 horizontal scanning lines.

2. Description of the Prior Art

The so-called NTSC television system has 525 horizontal scanning lines per frame, while the CCIR television systems such as a PAL, SFCAM etc. generally have 625 horizontal scanning lines per frame. The effective image frame generally contains about 480 horizontal scanning lines in the case of the NTSC system, or about 576 lines in the case of CCIR systems. The sampling of the television signal for image recording is generally conducted in the vertical direction of the frame, since sampling along the horizontal direction requires a very high sampling frequency and accordingly a high-speed A/D converter. The image recording of a line is conducted by the data thus sampled in the vertical direction, and that of a frame is achieved by horizontally displacing, in succession, the position of said vertical sampling.

A vertical sampling of the NTSC signal provides about 480 samples per effective frame, while that of the CCIR signal provides about 576 samples, thus giving rise to a different image print size. Consequently, printers for the CCIR system have been larger than that for the NTSC system, and it has been necessary to develop completely different printers for the NTSC system and for the CCIR system.

SUMMARY OF THE INVENTION

In consideration of the foregoing, the object of the present invention is to provide an image forming apparatus capable of obtaining hard copies from a video signal having 625 horizontal scanning lines with substantially the same mechanical design as that for obtaining hard copies from the video signal of the NTSC system having 525 horizontal scanning lines.

The foregoing and other objects of the present invention will become fully apparent from the following detailed description.

BRIEF DESCRIPTION OF THE DRAWINGS

FIG. 3 is a chart showing the function of said converting circuit.

BRIEF DESCRIPTION OF THE PREFERRED EMBODIMENTS

Now the present invention will be described in detail by an embodiment thereof shown in the attached drawings.

Figure 1:
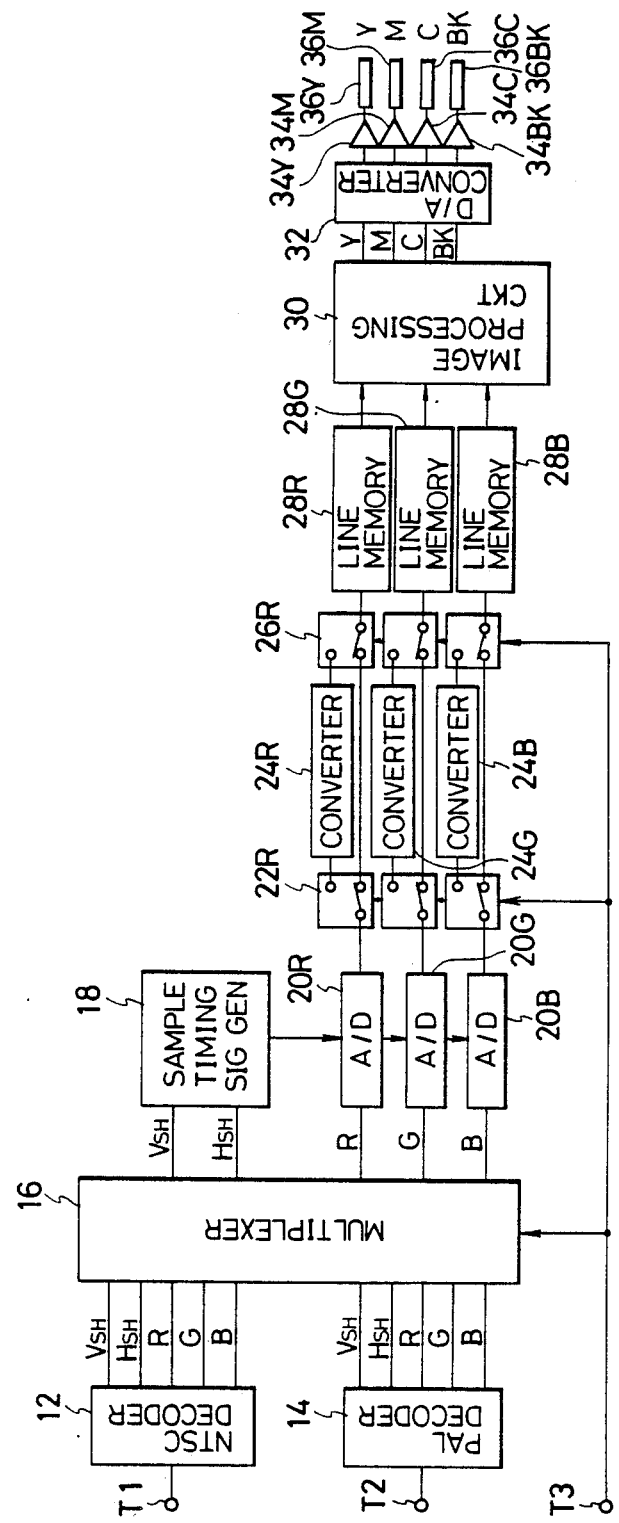
FIG. 1 is a block diagram of a video signal processing circuit for use in the image forming apparatus of the present invention.

FIG. 1 is a block diagram of a video signal processing circuit for use in the image forming apparatus of the present invention.

In FIG. 1, there are shown an input terminal T1 for an NTSC video signal; an input terminal T2 for a PAL video signal; an input terminal T3 for an NTSC/PAL selecting signal; and NTSC decoder 12 and a PAL decoder 14 respectively releasing a vertical synchronization signal $V_{SH}$, a horizontal synchronization signal $H_{SH}$ and color signals R, G, B; a multiplexer 16 for selecting either the decoder 12 or 14; a sample timing generator 18 for releasing timing signals for vertical sampling of the frame with a circuit as disclosed in the Japanese Patent Laid-open 117386/1980; A/D converters 20R, 20G, 20B; switches 22, 26 to be shifted in response to the NTSC/PAL selecting signal; converting circuit 24R, 24G, 24B constituting converting means of the present invention of which function will be explained later; line memories 28R, 28G, 28B; an image processing circuit 30 for masking, gamma ($\gamma$) correction, YMC conversion, background removal, black image generation etc.; a D/A converter 32; driver circuits 34Y, 34M, 34C, 34Bk for driving an ink jet heads 36 composed of an ink jet head 36Y for yellow ink, an ink jet head 36M for magenta ink, an ink jet head 36C for cyan ink and an ink jet head 36Bk for black ink.

The function of the above-described circuit is as follows. When the NTSC video signal is selected by the NTSC/PAL selecting signal entered from the terminal T3, the multiplexer 16 selects the output of the NTSC decoder 12 and supplies the synchronization signals $V_{SH}$, $H_{SH}$ to the sample timing generator 18, and color signals to the A/D converters 20R, 20G, 20B, which perform A/D conversion according to the timing signals released from said sample timing generator 18. As the switches 22, 26 are positioned at the lower contacts in response to said selecting signal in this state, the output signals of the A/D converters 20 are directly supplied to the line memories 28R, 28G, 28B, of which output signals are subjected to various processes in the image processing circuit 30 and supplied to the D/A converter 32, whereby the ink jet heads 36Y, 36M, 36C, 36Bk respectively emit the inks of amounts corresponding to the color signals Y, M, C, Bk.

When the PAL video signal is selected by said selecting signal, the multiplexer 16 selects the PAL decoder 14, and the switches 22, 26 are positioned at the upper contacts. Consequently the data converted in the A/D converters 20R, 20G, 20B are respectively supplied to the converting circuits 24R, 24G, 24B to convert six pixels in the original data into five pixels.

Figure 2:
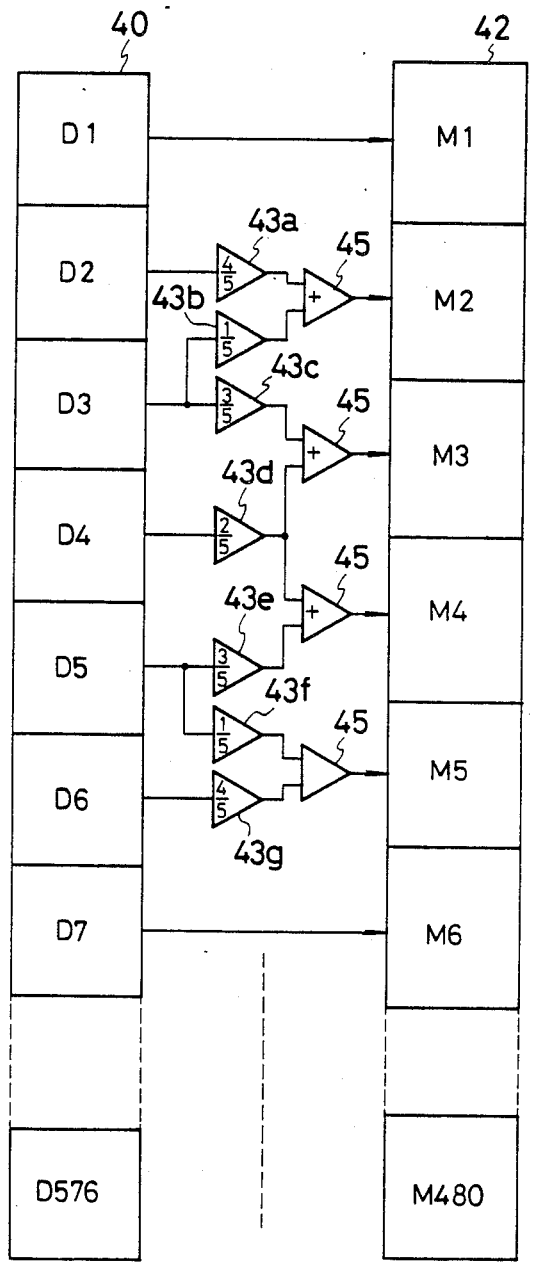
FIG. 2 is a detailed circuit diagram of a converting circuit shown in FIG. 1.

FIG. 2 shows the detail of the converting circuit 24, wherein an input line memory 40 has a capacity of 576 pixels corresponding to the number of effective scanning lines in the PAL video signal. An output line memory 42 has a capacity of 480 pixels corresponding to the number of effective scanning lines in the NTSC video signal. There are further shown multiplexers 43a–43g, and adders 45.

Figure 3:
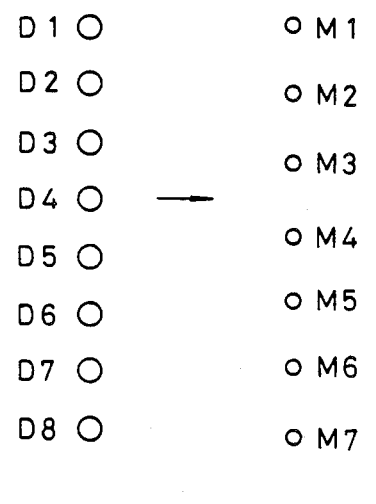

Since six input pixels are converted into five output pixels, the input data D1, ... and output data M1, ... assume positional relationship as shown in FIG. 3.

Consequently the output signal M1 or M6 is same as the input signal D1 or D7. On the other hand, the output signal M2 is determined as follows, according to the positional distances to the input signals D2, D3:

$$M2 = \frac{4}{5} D2 + \frac{1}{5} D3.$$

Also the output signals M3, M4 and M5 are defined as follows:

$$M3 = \frac{3}{5} D3 + \frac{2}{5} D4$$

$$M4 = \frac{2}{5} D4 + \frac{3}{5} D5$$

$$M5 = \frac{1}{5} D5 + \frac{4}{5} D6$$

In general terms:

$$M(5n - 4) = D(6n - 5)$$

$$M(5n - 3) = \frac{4}{5}(6n - 4) + \frac{1}{5}(6n - 3)$$

$$M(5n - 2) = \frac{3}{5}(6n - 3) + \frac{2}{5}(6n - 2)$$

$$M(5n - 1) = \frac{2}{5}(6n - 2) + \frac{3}{5}(6n - 1)$$

$$M(5n) = \frac{1}{5}(6n - 1) + \frac{4}{5}(6n)$$

wherein n is an integer from 0 to 96.

In this manner the input 576 pixels are converted into output 480 pixels. Said conversion can also be achieved by a software for example of a microcomputer.

The data in the output line memory 42 are supplied to the image processing circuit 30 either directly or through the line memories 28, and the operations thereafter are identical as those for NTSC video signal.

Consequently a printer of a same basic structure can be used for both the NTSC video signal and the PAL video signal having 625 horizontal scanning lines, since the number of pixels in a vertical line for such PAL video signal can be made completely same as that for the NTSC video signal. The conversion of the number of pixels in the horizontal direction is unnecessary because the horizontal scanning time is substantially same for the NTSC system and for the CCIR systems. Also, even if the number of samples in the horizontal direction varies, there will result no problem as the length of the printer in the main scanning direction is constant.

In the present embodiment the 576 sampled pixels are converted into 480 pixels, but it is also possible to convert said samples into 480×n pixels to obtain a larger image.

The apparatus of the present embodiment is designed for both NTSC and PAL video signals, but it may also be designed exclusively for a CCIR video signal such as PAL video signal, in which case the NTSC decoder can be dispensed with. Also the image recording method is not limited to the ink jet recording but can be modified in many ways.

As explained in detail in the foregoing, the present invention enables one to obtain hard copies from CCIR video signals with 625 horizontal scanning lines with an image forming apparatus for NTSC video signal through the use of a simple converting means, and is therefore highly valuable in the industry. The converting means can be constructed very easily since it only converts 6 pixels in the vertical direction into 5 pixels.

It is to be understood that the present invention is not limited to the foregoing embodiment but is subject to variations and modifications within the scope and spirit of the appended claims.

What we claim is:

1. An image forming apparatus comprising:
   generating means for generating an analog video signal including a large number of horizontal scanning lines;
   sampling signal generating means for generating a sampling signal to sample said video signal point by point with respect to each horizontal scanning line;
   analog-digital converting means for converting said analog video signal into a digital value in response to said sampling signal;
   memory means for storing said digital value;
   pixel number converting means, including a multiplier unit in which each digital value in said memory means is multiplied by a predetermined coefficient and an adder unit in which the multiplied results of consecutive digital values of said multiplier unit are added for converting six digital values in said memory means into five output values; and
   image forming means for image formation in response to signals corresponding to said output values of said converting means.

2. An image forming apparatus according to claim 1, wherein said video signal is a CCIR video signal.

3. An image forming apparatus according to claim 1, wherein said video signal has 625 horizontal scanning lines per frame.

4. An image forming apparatus according to claim 1, wherein said video signal is an NTSC signal or a CCIR signal, and the conversion by said converting means is not conducted for said NTSC signal.

5. An image forming apparatus according to claim 1, wherein said image forming means is adapted to form a hard copy image on a recording medium.

6. An image forming apparatus according to claim 5, wherein said image forming means includes an ink jet recorder.

7. An image processing apparatus comprising:
   input means for inputting an NTSC video signal or a CCIR video signal;
   sampling signal generating means for generating a sampling signal to sample the video signal point by point with respect to each horizontal scanning line of said NTSC signal or said CCIR signal;
   analog-digital converting means for converting said analog video signal into a digital value in response to said sampling signal;
   memory means for storing said digital value;
   pixel number converting means, including a multiplier unit in which each digital value in said memory means is multiplied by a predetermined coefficient and an adder unit in which the multiplier results of consecutive digital values of said multiplier unit are added for converting the six digital values in said memory means into five output values; and
   control means adapted to activate said converting means when said video signal is said CCIR video signal and bypass said converting means when said video signal is said NTSC video signal.

8. An image processing apparatus according to claim 7, further comprising image forming means for forming an image in response to the output of said converting means.

9. An image processing apparatus according to claim 8, wherein said image forming means is adapted to form a hard copy image on a recording medium.

10. An image processing apparatus according to claim 9, wherein said image forming means includes an ink jet recorder.